(12) United States Patent
Timmerman et al.

(10) Patent No.: US 10,723,835 B2
(45) Date of Patent: Jul. 28, 2020

(54) ELECTROCHROMIC MULTI-LAYER DEVICES WITH CROSS-LINKED ION CONDUCTING POLYMER

(71) Applicant: Kinestral Technologies, Inc., South San Francisco, CA (US)

(72) Inventors: Nicolas Timmerman, South San Francisco, CA (US); Mark Micklatcher, South San Francisco, CA (US); Justin Kerszulis, South San Francisco, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 6 days.

(21) Appl. No.: 15/662,740

(22) Filed: Jul. 28, 2017

(65) Prior Publication Data

US 2017/0329196 A1    Nov. 16, 2017

Related U.S. Application Data

(62) Division of application No. 14/994,090, filed on Jan. 12, 2016, now Pat. No. 9,720,299.

(60) Provisional application No. 62/102,401, filed on Jan. 12, 2015.

(51) Int. Cl.
| | | |
|---|---|---|
| *G02F 1/155* | (2006.01) |
| *C08K 5/46* | (2006.01) |
| *C08L 63/00* | (2006.01) |
| *C08G 59/22* | (2006.01) |
| *C08K 5/43* | (2006.01) |
| *G02F 1/1523* | (2019.01) |
| *G02F 1/15* | (2019.01) |

(52) U.S. Cl.
CPC .............. *C08G 59/223* (2013.01); *C08K 5/43* (2013.01); *G02F 1/1525* (2013.01); *G02F 2001/164* (2019.01)

(58) Field of Classification Search
None
See application file for complete search history.

(56) References Cited

U.S. PATENT DOCUMENTS

| | | |
|---|---|---|
| 5,187,032 A | 2/1993 | Sasaki et al. |
| 5,227,043 A | 7/1993 | Shakushiro et al. |
| 5,300,374 A * | 4/1994 | Agrawal ................. C08L 71/02 427/386 |
| 5,837,157 A | 11/1998 | Kohjiya et al. |
| 6,159,389 A | 12/2000 | Miura et al. |
| 6,573,009 B1 | 6/2003 | Noda et al. |
| 6,680,149 B2 | 1/2004 | Noh et al. |
| 7,235,331 B2 | 6/2007 | Noda et al. |

(Continued)

*Primary Examiner* — Joseph D Anthony
(74) *Attorney, Agent, or Firm* — Womble Bond Dickinson (US) LLP

(57) ABSTRACT

Multi-layer electrochromic structures, and processes for assembling such structures, incorporating a cross-linked ion conducting polymer layer that maintains high adhesive and cohesive strength in combination with high ionic conductivity for an extended period of time, the ion conducting polymer layer characterized by electrochemical stability at voltages between about 1.3 V and about 4.4 V relative to lithium, lithium ion conductivity of at least about $10^{-5}$ s/cm, and lap shear strength of at least 100 kPa, as measured at 1.27 mm/min in accordance with ASTM International standard D1002 or D3163.

7 Claims, 3 Drawing Sheets

(56) References Cited

U.S. PATENT DOCUMENTS

| | | | |
|---|---|---|---|
| 8,754,138 B2 | 6/2014 | Michot et al. | |
| 9,249,353 B2 | 2/2016 | Posset et al. | |
| 2003/0008205 A1* | 1/2003 | Horie | H01M 6/42 |
| | | | 429/120 |
| 2003/0175594 A1* | 9/2003 | Roh | H01M 10/0525 |
| | | | 429/303 |
| 2004/0126665 A1* | 7/2004 | Sun | H01M 10/052 |
| | | | 429/303 |
| 2007/0154813 A1* | 7/2007 | Sato | H01M 4/0402 |
| | | | 429/246 |
| 2007/0183066 A1* | 8/2007 | Varaprasad | B32B 17/06 |
| | | | 359/844 |
| 2010/0036060 A1* | 2/2010 | Nakamura | H01B 1/122 |
| | | | 525/329.5 |
| 2011/0027662 A1* | 2/2011 | Nishimura | H01M 10/0525 |
| | | | 429/323 |
| 2011/0081575 A1* | 4/2011 | Voelker | H01M 4/13 |
| | | | 429/217 |
| 2013/0065097 A1* | 3/2013 | Hosaka | H01M 10/0585 |
| | | | 429/61 |
| 2014/0245599 A1* | 9/2014 | Voelker | H01M 4/13 |
| | | | 29/623.1 |
| 2015/0070743 A1* | 3/2015 | Branda | G02F 1/15 |
| | | | 359/241 |
| 2015/0125752 A1* | 5/2015 | Nishimura | H01M 4/133 |
| | | | 429/231.4 |

\* cited by examiner

Step 1.

Step 2.

Step 3.

Step 4.

Step 5.

Step 6.

ELECTROCHROMIC MULTI-LAYER DEVICES WITH CROSS-LINKED ION CONDUCTING POLYMER

FIELD OF THE INVENTION

The present disclosure generally relates to cross-linked ion conducting polymers for thin film deposition onto a substrate for the formation of switchable electrochromic multi-layer devices, and methods for assembling multi-layer structures comprising such films.

BACKGROUND

Commercial switchable glazing devices, also commonly known as smart windows and electrochromic window devices, are well known for use as mirrors in motor vehicles, aircraft window assemblies, sunroofs, skylights, and architectural windows. Such devices may comprise, for example, active inorganic electrochromic layers, organic electrochromic layers, inorganic ion-conducting layers, organic ion-conducting layers and hybrids of these sandwiched between two conducting layers. When a voltage is applied across these conducting layers the optical properties of a layer or layers in between change. Such optical property changes typically include a modulation of the transmissivity of the visible or the solar sub-portion of the electromagnetic spectrum. For convenience, the two optical states will be referred to as a bleached state and a darkened state in the present disclosure, but it should be understood that these are merely examples and relative terms (i.e., a first one of the two states is more transmissive or "more bleached" than the other state and the other of the two states is less transmissive or "more darkened" than the first state) and that there could be a set of bleached and darkened states between the most transmissive state and the least transmissive state that are attainable for a specific electrochromic device; for example, it is feasible to switch between intermediate bleached and darkened states in such a set.

The broad adoption of electrochromic window devices in the construction and automotive industries will require a ready supply of low cost, aesthetically appealing, durable products in large area formats. Electrochromic window devices based on metal oxides represent the most promising technology for these needs. Typically, such devices comprise two electrochromic materials (a cathode and an anode) separated by an ion-conducting film and sandwiched between two transparent conducting oxide (TCO) layers. In operation, a voltage is applied across the device that causes current to flow in the external circuit, oxidation and reduction of the electrode materials and, to maintain charge balance, mobile cations to enter or leave the electrodes. This facile electrochemical process causes the window to reversibly change from a more bleached (e.g., a relatively greater optical transmissivity) to a more darkened state (e.g., a relatively lesser optical transmissivity).

Ion conducting materials used in electrochromic windows are typically capable of adhering the two TCO layers to one another to form a multi-layer stack. Prior art ion conducting materials, however, suffer from certain limitations that impede the performance and durability of the electrochromic windows that encompass such ion conducting materials. Specifically, ion conducting polymers having high conductivity to ions such as lithium typically do not possess the mechanical properties necessary to endure physical stresses and strain placed on the multi-layer stack during its manufacture, its incorporation into a structure (e.g., an automobile, aircraft, or building), and/or its intended end-use environment (e.g., as an architectural window, sunroof, skylight, mirror, etc., in such a structure). Conversely, ion conducting materials capable of enduring significant physical stress without succumbing to adhesive or cohesive failure typically do not possess the electrochemical properties necessary to maintain high ionic conductivity over an extended period of time under variable environmental conditions.

Briefly, therefore, the present disclosure is directed to multi-layer electrochromic structures incorporating a cross-linked ion conducting polymer layer that maintains high adhesive and cohesive strength in combination with high ionic conductivity for an extended period of time.

One aspect of the present disclosure is an electrochromic structure comprising a cross-linked lithium-ion conducting polymer layer between opposing first and second substrates, the first substrate comprising a first electrochromic layer between the first substrate and the cross-linked lithium-ion conducting polymer layer, wherein, at room temperature, the cross-linked ion conducting polymer (i) is electrochemically stable at voltages between about 1.3 V and about 4.4 V relative to lithium, (ii) has a lithium ion conductivity of at least about $10^{-5}$ S/cm, and (iii) lap shear strength of at least 100 kPa, as measured at 1.27 mm/min at room temperature in accordance with ASTM International standard D1002 or D3163.

A further aspect of the present disclosure is a process for forming an electrochromic structure. The process of assembling an electrochromic multi-layer stack comprises (A) depositing a layer of an ion conducting polymer feedstock onto a first multi-layer stack, the first multi-layer stack comprising a first substrate and a first electrode layer, (B) laminating a second multi-layer stack comprising a second substrate and a second electrode layer to the first multi-layer stack to form an electrochromic multi-layer stack comprising, in succession, the first substrate, the first electrode layer, the ion conducting polymer feedstock layer, the second electrode layer, and the second substrate, the first electrode layer, the second electrode layer, or both comprising an electrochromic material; and (C) irradiating the electrochromic multi-layer stack to polymerize the ion conducting polymer feedstock, forming a cross-linked ion conducting polymer layer, wherein the cross-linked ion conducting polymer, at room temperature, (i) is electrochemically stable at voltages between about 1.3 V and about 4.4 V relative to lithium, (ii) has a lithium ion conductivity of at least about $10^{-5}$ S/cm, and (iii) lap shear strength of at least 100 kPa, as measured at 1.27 mm/min in accordance with ASTM International standard D1002 or D3163.

A further aspect of the present disclosure is an ion conducting polymer feedstock material having a viscosity of about 20,000 cP to about 50,000 cP, the ion conducting polymer feedstock material comprising between about 5 wt. % and about 50 wt. % monomer, oligomer, or a mixture of monomers and/or oligomers, an ionizable charge carrier, and a plasticizer. In one embodiment, the ion conducting polymer feedstock material is capable of being cross-linked to form a cross-linked ion conducting polymer, wherein the cross-linked ion conducting polymer at room temperature is characterized by (i) electrochemical stability at voltages between about 1.3 V and about 4.4 V, (ii) ionic conductivity of at least about $10^{-5}$ S/cm, and (iii) lap shear strength of at least 100 kPa, as measured at 1.27 mm/min in accordance with ASTM International standard D1002 or D3163.

Other objects and features will be described hereinafter.

Figure 1:
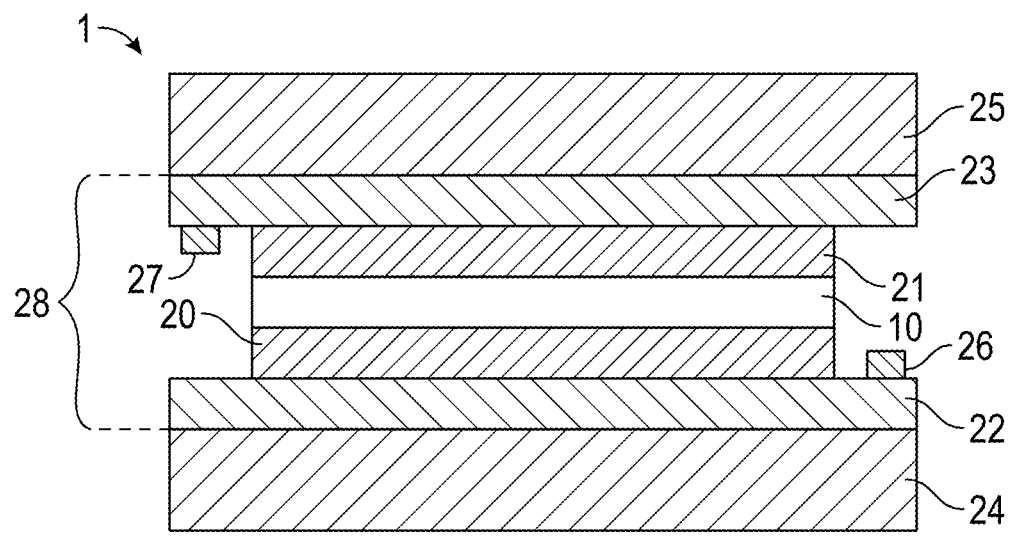
FIG. 1 is a schematic cross-section of a multi-layer electrochromic device of the present disclosure.
Figure 2:
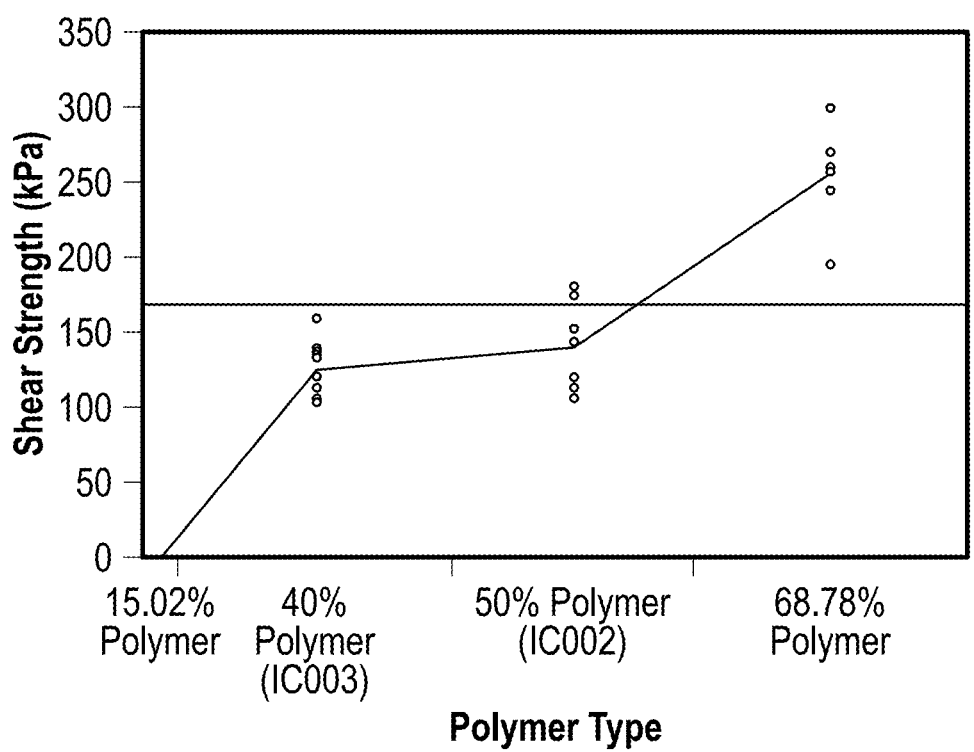
FIG. 2 is a plot illustrating variation in lap shear strength with polymer content.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The following definitions and methods are provided to better define the present disclosure and to guide those of ordinary skill in the art in the practice of the present disclosure. Unless otherwise noted, terms are to be understood according to conventional usage by those of ordinary skill in the relevant art.

The terms "amine" or "amino," as used herein alone or as part of another group, represents a group of formula —$N(R^8)(R^9)$, wherein $R^8$ and $R^9$ are independently hydrogen, hydrocarbyl, substituted hydrocarbyl, silyl, or $R^8$ and $R^9$ taken together form a substituted or unsubstituted cyclic or polycyclic moiety, each as defined in connection with such terms, typically having from 3 to 8 atoms in the ring. "Substituted amine," for example, refers to a group of formula —$N(R^8)(R^9)$, wherein at least one of $R^8$ and $R^9$ are other than hydrogen. "Unsubstituted amine," for example, refers to a group of formula —$N(R^8)(R^9)$, wherein $R^8$ and $R^9$ are both hydrogen.

The term "anodic electrochromic material" refers to an electrochromic material that changes from a less optically transmissive state to a less optically transmissive state (e.g., darkens) upon oxidation (i.e., removal of electrons).

The term "aryl" as used herein alone or as part of another group denotes optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The term "bleach" refers to the transition of an electrochromic material from a first optical state to a second optical state wherein the first optical state is less transmissive than the second optical state.

The term "bleached state voltage" refers to the open circuit voltage ($V^{oc}$) of the anodic electrochromic layer versus Li/Li+ in an electrochemical cell in a propylene carbonate solution containing 1M lithium perchlorate when the transmissivity of said layer is at 95% of its "fully bleached state" transmissivity.

The term "cathodic electrochromic material" refers to an electrochromic material that changes from a less optically transmissive state to a more optically transmissive state (e.g., darkens) upon reduction (i.e., addition of electrons).

The term "darken" refers to the transition of an electrochromic material from a first optical state to a second optical state wherein the first optical state is more transmissive than the second optical state.

The term "electrochromic material" refers to a material that is able to change its optical properties as a result of the insertion or extraction of ions and electrons. For example, an electrochromic material may change between (i) a colored, translucent or opaque state and a transparent state or (ii) a colored, opaque state and a colored, translucent state. In some examples, the change can be reversible while in other examples, the change can be irreversible.

The term "electrical potential," or simply "potential," refers to the voltage occurring across a device comprising an electrode/ion conductor/electrode stack.

The term "electrochemically matched" refers to a set of cathode and anode electrochromic films or materials with similar charge capacities and complementary oxidation states such that when joined together by a suitable ion-conducting and electrically insulating layer, a functional electrochromic device is formed that shows reversible switching behavior over a substantial range of the theoretical charge capacities of the films or materials, respectively.

The term "electrode layer" refers to a layer capable of conducting ions as well as electrons. The electrode layer contains a species that can be oxidized when ions are inserted into the material and contains a species that can be reduced when ions are extracted from the layer. This change in oxidation state of a species in the electrode layer is responsible for the change in optical properties in the device.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The term "fully bleached state" as used in connection with an anodic electrochromic material refers to the state of maximum transmissivity of an anodic electrochromic layer in an electrochemical cell at or above 1.5V versus Li/Li+ in a propylene carbonate solution containing 1 M lithium perchlorate at 25° C. (under anhydrous conditions and in an Ar atmosphere).

The terms "halide," "halogen" or "halo" as used herein alone or as part of another group refer to chlorine, bromine, fluorine, and iodine.

The term "lap shear strength" as used herein refers to the stress point at which either adhesive or cohesive failure occurs.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The term "silyl" as used herein describes substituents of the general formula —Si($X^8$)($X^9$)($X^{10}$) where $X^8$, $X^9$, and $X^{10}$ are independently hydrocarbyl or substituted hydrocarbyl.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters, ethers, and thioethers.

The term "transmissive" is used to denote transmission of electromagnetic radiation through a material.

The term "transmissivity" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 400-730 nm using the spectral photopic efficiency I_p(lambda) (CIE, 1924) as a weighting factor. (Ref: ASTM E1423).

The term "transparent" is used to denote substantial transmission of electromagnetic radiation through a material such that, for example, bodies situated beyond or behind the material can be distinctly seen or imaged using appropriate image sensing technology.

DETAILED DESCRIPTION OF THE PREFERRED EMBODIMENTS

To address these deficiencies, the present disclosure provides ion conducting polymers with sufficient cross-link densities to endure high levels of physical stress without limiting ion mobility, while remaining electrochemically stable.

FIG. 1 depicts a cross-sectional structural diagram of electrochromic device 1 according to a first embodiment of the present disclosure. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 which, in turn, are arranged against outer substrates 24, 25. Elements 22, 20, 10, 21, and 23 are collectively referred to as an electrochromic stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 10 may be changed by applying a voltage pulse to electrically conductive layers 22 and 23. The pulse causes electrons and ions to move between first and second electrode layers 20 and 21 and, as a result, electrochromic material in the first and/or second electrode layer(s) change(s) optical states, thereby switching electrochromic device 1 from a more transmissive state to a less transmissive state, or from a less transmissive state to a more transmissive state. In one embodiment, electrochromic device 1 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by electrochromic materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an electrochromic device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific electrochromic device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" refers to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

Referring again to FIG. 1, the materials making up electrochromic stack 28 may comprise organic or inorganic materials, and they may be solid or liquid. For example, in certain embodiments the electrochromic stack 28 comprises materials that are inorganic, solid (i.e., in the solid state), or both inorganic and solid. Inorganic materials have shown better reliability in architectural applications. Materials in the solid state can also offer the advantage of not having containment and leakage issues, as materials in the liquid state often do. It should be understood that any one or more of the layers in the stack may contain some amount of organic material, but in many implementations one or more of the layers contains little or no organic matter. The same can be said for liquids that may be present in one or more layers in small amounts. In certain other embodiments some or all of the materials making up electrochromic stack 28 are organic. Organic ion conductors can offer higher mobilities and thus potentially better device switching performance. Organic electrochromic layers can provide higher contrast ratios and more diverse color options. Each of the layers in the electrochromic device is discussed in detail, below. It should also be understood that solid state material may be deposited or otherwise formed by processes employing liquid components such as certain processes employing sol-gels or chemical vapor deposition.

Ion conductor layer 10 serves as a medium through which ions are transported (in the manner of an electrolyte) when the electrochromic device switches between an optically less transmissive ("colored") state and an optically more transmissive ("bleached"). Stated differently, the ion conducting layer permits sufficient ionic conduction between the first and second electrode layers 20, 21 upon the application of a voltage across electrochromic stack 28. Depending on the choice of materials, such ions include lithium ions ($Li^+$) and hydrogen ions ($H^+$) (i.e., protons). Other ions may also be employed in certain embodiments. These include deuterium ions ($D^+$), sodium ions ($Na^+$), potassium ions ($K^+$), calcium ions ($Ca^{++}$), barium ions ($Ba^{++}$), strontium ions ($Sr^{++}$), and magnesium ions ($Mg^{++}$). In one embodiment, ion conductor layer 10 has a lithium ion conductivity of at least about $10^{-5}$ S/cm at room temperature (i.e., 25° C.). For example, in one such embodiment, ion conductor layer 10 has a lithium ion conductivity of at least about $10^{-4}$ S/cm at room temperature. By way of further example, in one such embodiment ion conductor layer 10 has a lithium ion conductivity of at least about $10^{-3}$ S/cm at room temperature. By way of further example, in one such embodiment ion conductor layer 10 has a lithium ion conductivity of at least about $10^{-2}$ S/cm at room temperature. Preferably, ion conductor layer 10 has sufficiently low electron conductivity that negligible electron transfer takes place during normal operation.

Ion conductor layer 10 is also preferably sufficiently durable so as to withstand repeated cycling of the electrochromic device between an optically less transmissive state and an optically more transmissive state. For example, in one such embodiment, lithium ion conductivity of ion conductor layer 10 varies less than about 0.1% to about 5% upon cycling of the electrochromic device between a less transmissive state (e.g. about 5% transmissive) and a more transmissive state (e.g. about 70% transmissive) for at least 100 hours at 85° C. By way of further example, in one such embodiment lithium ion conductivity of ion conductor layer 10 varies less than about 0.01% to about 2% upon cycling of the electrochromic device between a less transmissive state and a more transmissive state for at least 100 hours at 85° C.

In some embodiments, ion conductor layer 10 has a relatively low glass transition temperature ($T_g$), enabling the cured polymer network to remain soft and pliable upon exposure of electrochromic stack 28 to low environmental temperatures. For example, in one embodiment, ion conductor layer 10 has a glass transition temperature of less than about −5° C. to about −40° C. and more particularly between the range of about −10° C. to about −25° C. The glass transition temperature of ion conductor layer 10 may be lowered under controlled conditions, e.g. the addition of a plasticizer, according to methods known in the art (see, e.g., U.S. Patent Publication No. 20120237704).

The voltage applied across electrochromic stack 28 to reversibly switch electrochromic device between an optically less transmissive state and an optically more transmissive state is typically in the range of about 1 V to about ~4.5 V versus lithium ($Li/Li^+$). In general, therefore, it is preferred that ion conducting layer be electrochemically stable (or within the electrochemical window) at voltages within this range. For example, in one such embodiment the ion conducting layer is electrochemically stable at voltages in the range of about 1.3 V and about 4.4 V relative to lithium ($Li/Li^+$). By way of further example, in one such embodiment the ion conducting layer is electrochemically stable at voltages in the range of about 1.3 V and about 4 V relative to lithium ($Li/Li^+$). By way of further example, in one such embodiment the ion conducting layer is electrochemically stable at voltages in the range of about 2 V and about 4 V relative to lithium ($Li/Li^+$).

Additionally, to enable electrochromic stack 28 to endure a range of physical stresses to which it may be exposed during the manufacture of electrochromic device 1, its incorporation into a structure (e.g., an automobile, aircraft, or building), and/or its intended end-use environment (e.g., as an architectural window, sunroof, skylight, mirror, etc., in such a structure), ion conductor layer 10 also possesses sufficient cohesion and adhesion to the first and second electrode layers 20 and 21. For example, in one embodiment, ion conductor layer 10 has a lap shear strength of at least 100 kPa to at least 600 kPa, and more particularly between the range of 200 kPa to 400 kPa, as measured at 1.27 mm/min, at room temperature, in accordance with ASTM International standard D1002 or D3163. Preferably, ion conductor layer 10 is elastically deformable. In one exemplary embodiment, ion conductor layer 10 has an elongation to failure of at least 1 mm.

Some non-exclusive examples of electrolytes typically incorporated into ion conductor layer 10 are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI (lithium bis(trifluoromethane) sulfonimide), $LiBF_4$ (lithium tetrafluoroborate), $LiAsF_6$ (lithium hexafluoro arsenate), $LiCF_3SO_3$ (lithium trifluoromethane sulfonate), and $LiClO_4$ (lithium perchlorate). Additional examples of suitable ion conducting layers include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conducting layer comprises a silicate-based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conductor layer 10 will vary depending on the material. In some embodiments using an inorganic ion conductor the ion conductor layer 10 is about 250 nm to 1 nm thick, and more particularly about 50 nm to 5 nm thick. In some embodiments using an organic ion conductor, the ion conducting layer is between about 1 μm and 1000 μm thick or, more particularly, between about 100 μm and 500 μm thick. The thickness of the ion conducting layer is also substantially uniform. In one embodiment, a substantially uniform ion conducting layer varies by not more than about +/−10% in each of the aforementioned thickness ranges. In another embodiment, a substantially uniform ion conducting layer varies by not more than about +/−5% in each of the aforementioned thickness ranges. In another embodiment, a substantially uniform ion conducting layer varies by not more than about +/−3% in each of the aforementioned thickness ranges.

Still referring to FIG. 1, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, including soda lime float glass. The glass may be tempered or untempered. In some embodiments of electrochromic device 1 with glass, e.g. soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

The substrate first and or second substrates may also be a composite of two or materials. Thin glass or plastic substrates may be used to manufacture the electrochromic device and may be laminated to a thicker carrier glass to provide mechanical strength and durability to large scale products incorporating the electrochromic devices. In some embodiments the carrier glass is tempered glass. The thicker carrier glass may be laminated to the thinner substrates prior to deposition of the layers of the electrochromic device or after the completion of the device and the lamination of the ion conductor. Additionally there may be more than one electrochromic device formed on thin glass or plastic laminated to carrier glass, thereby increasing the possible strain on the device. The use of carrier glass increases the weight and embodiments of the current invention may be advantageous in maintaining the durability and mechanical strength of devices according to embodiments of this disclosure. The tunability of the ion conductor to provide the desired bonding strength once cross-linked is an advantage in these embodiments.

Additionally, in an Insulated Glass Unit (IGU) there are typically at least two complete electrochromic devices integrated on each of the panes. In some embodiments there may be more than two panes having electrochromic devices or an additional pane of glass only to increase the insulative properties of the IGU.

In one preferred embodiment of the disclosure, first substrate 24 and second substrate 25 are each float glass. In certain embodiments for architectural applications, this glass is at least 0.5 meters by 0.5 meters, and can be much larger, e.g., as large as about 3 meters by 4 meters. In such applications, this glass is typically at least about 2 mm thick and more commonly 4-6 mm thick.

Independent of application, the electrochromic devices of the present disclosure may have a wide range of sizes. In general, it is preferred that the electrochromic device comprise a substrate having a surface with a surface area of at least 0.001 meter$^2$. For example, in certain embodiments, the electrochromic device comprises a substrate having a surface with a surface area of at least 0.01 meter$^2$. By way of further example, in certain embodiments, the electrochromic device comprises a substrate having a surface with a surface area of at least 0.1 meter$^2$. By way of further example, in certain embodiments, the electrochromic device comprises a substrate having a surface with a surface area of at least 1 meter$^2$. By way of further example, in certain embodiments, the electrochromic device comprises a substrate having a surface with a surface area of at least 5 meter$^2$. By way of further example, in certain embodiments, the electrochromic device comprises a substrate having a surface with a surface area of at least 10 meter$^2$.

At least one of the two electrically conductive layers 22, 23 is also preferably transparent in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nano particles (e.g., rods, tubes, dots) conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 µm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 1, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electric connection between the voltage source and the electrically conductive layers 22 and 23.

In one embodiment, the sheet resistance, $R_s$, of the first and second electrically conductive layers 22 and 23 is about 500Ω/☐ to 1Ω/☐. In some embodiments, the sheet resistance of first and second electrically conductive layers 22 and 23 is about 100Ω/☐ to 5Ω/☐. In general, it is desirable that the sheet resistance of each of the first and second electrically conductive layers 22 and 23 be about the same. In one embodiment, first and second electrically conductive layers 22 and 23 each have a sheet resistance of about 20Ω/☐ to about 8 Ω/☐.

To facilitate more rapid switching of electrochromic device 1 from a state of relatively greater transmittance to a state of relatively lesser transmittance, or vice versa, at least one of electrically conductive layers 22, 23 preferably has a sheet resistance, $R_s$, to the flow of electrons through the layer that is non-uniform. For example, in one embodiment only one of first and second electrically conductive layers 22, 23 has a non-uniform sheet resistance to the flow of electrons through the layer. Alternatively, and typically more preferably, first electrically conductive layer 22 and second electrically conductive layer 23 each have a non-uniform sheet resistance to the flow of electrons through the respective layers. Without being bound by any particular theory, it is presently believed that spatially varying the sheet resistance of electrically conductive layer 22, spatially varying the sheet resistance of electrically conductive layer 23, or spatially varying the sheet resistance of electrically conductive layer 22 and electrically conductive layer 23 improves the switching performance of the device by controlling the voltage drop in the conductive layer to provide uniform potential drop or a desired non-uniform potential drop across the device, over the area of the device.

In general, electrical circuit modeling may be used to determine the sheet resistance distribution providing desired switching performance, taking into account the type of electrochromic device, the device shape and dimensions, electrode characteristics, and the placement of electrical connections (e.g., bus bars) to the voltage source. The sheet resistance distribution, in turn, can be controlled, at least in part, by grading the thickness of the first and/or second electrically conductive layer(s), grading the composition of the first and/or second electrically conductive layer(s), or patterning the first and/or second electrically conductive layer(s), or some combination of these.

In one exemplary embodiment, the electrochromic device is a rectangular electrochromic window. Referring again to FIG. 1, in this embodiment first substrate 24 and second substrate 25 are rectangular panes of glass or other transparent substrate and electrochromic device 1 has two bus bars 26, 27 located on opposite sides of first electrode layer 20 and second electrode layer 21, respectively. When configured in this manner, it is generally preferred that the resistance to the flow of electrons in first electrically conductive layer 22 increases with increasing distance from bus bar 26 and that the resistance to the flow of electrons in second electrically conductive layer 23 increases with increasing distance from bus bar 27. This, in turn, can be effected, for example, by decreasing the thickness of first electrically conductive layer 22 as a function of increasing distance from bus bar 26 and decreasing the thickness of second electrically conductive layer 23 as a function of increasing distance from bus bar 27.

The multi-layer devices of the present disclosure may have a shape other than rectangular, may have more than two bus bars, and/or may not have the bus bars on opposite sides of the device. For example, the multi-layer device may have a perimeter that is more generally a quadrilateral, or a shape with greater or fewer sides than four for example, the multi-layer device may be triangular, pentagonal, hexagonal, etc., in shape. By way of further example, the multi-layer device may have a perimeter that is curved but lacks vertices, e.g., circular, oval, etc. By way of further example, the multi-layer device may comprise three, four or more bus bars connecting the multi-layer device to a voltage source, or the bus bars, independent of number may be located on non-opposing sides. In each of such instances, the preferred resistance profile in the electrically conductive layer(s) may vary from that which is described for the rectangular, two bus bar configuration.

Referring again to FIG. 1, at least one of first and second electrode layers 20 and 21 is electrochromic, one of the first and second electrode layers is the counter electrode for the other, and first and second electrode layers 20 and 21 are inorganic and/or solid. Non-exclusive examples of electrochromic electrode layers 20 and 21 are cathodically coloring thin films of oxides based on tungsten, molybdenum, niobium, titanium, lead and/or bismuth, or anodically coloring thin films of oxides, hydroxides and/or oxy-hydrides based on nickel, iridium, iron, chromium, cobalt and/or rhodium.

In one embodiment, first electrode layer 20 contains any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_3$), nickel oxide ($Ni_2O_3$), cobalt oxide ($Co_2O_3$) and the like. In some embodiments, the metal oxide is doped with one or more dopants such as lithium, sodium, potassium, molybdenum, vanadium, titanium, and/or other suitable metals or compounds containing metals. Mixed oxides (e.g., W—Mo oxide, W—V oxide) are also used in certain embodiments.

In some embodiments, tungsten oxide or doped tungsten oxide is used for first electrode layer 20. In one embodiment, first electrode layer 20 is electrochromic and is made substantially of $WO_x$, where "x" refers to an atomic ratio of oxygen to tungsten in the electrochromic layer, and x is between about 2.7 and 3.5. In certain embodiments, the electrochromic mixed metal oxide is crystalline, nanocrystalline, or amorphous. In some embodiments, the tungsten oxide is substantially nanocrystalline, with grain sizes, on average, from about 5 nm to 50 nm (or from about 5 nm to 20 nm), as characterized by transmission electron microscopy (TEM). The tungsten oxide morphology may also be characterized as nanocrystalline using x-ray diffraction (XRD); XRD. For example, nanocrystalline electrochromic tungsten oxide may be characterized by the following XRD features: a crystal size of about 10 to 100 nm (e.g., about 55 nm. Further, nanocrystalline tungsten oxide may exhibit limited long range order, e.g., on the order of several (about 5 to 20) tungsten oxide unit cells.

The thickness of the first electrode layer 20 depends on the electrochromic material selected for the electrochromic layer. In some embodiments, first electrode layer 20 is about 50 nm to 2,000 nm, or about 100 nm to 700 nm. In some embodiments, the first electrode layer 20 is about 250 nm to about 500 nm.

Second electrode layer 21 serves as the counter electrode to first electrode layer 20 and, like first electrode layer 20, second electrode layer 21 may comprise electrochromic materials as well as non-electrochromic materials. Non-exclusive examples of second electrode layer 21 are cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films, e.g., of oxides based on vanadium and/or cerium as well as activated carbon. Also combinations of such materials can be used as second electrode layer 21.

In some embodiments, second electrode layer 21 may comprise one or more of a number of different materials that are capable of serving as reservoirs of ions when the electrochromic device is in the bleached state. During an electrochromic transition initiated by, e.g., application of an appropriate electric potential, the counter electrode layer transfers some or all of the ions it holds to the electrochromic first electrode layer 20, changing the electrochromic first electrode layer 20 to the colored state.

In some embodiments, suitable materials for a counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. Optically passive counter electrodes comprise cerium titanium oxide ($CeO_2$—$TiO_2$), cerium zirconium oxide ($CeO_2$—$ZrO_2$), nickel oxide (NiO), nickel-tungsten oxide (NiWO), vanadium oxide ($V_2O_5$), and mixtures of oxides (e.g., a mixture of $Ni_2O_3$ and $WO_3$). Doped formulations of these oxides may also be used, with dopants including, e.g., tantalum and tungsten. Because first electrode layer 20 contains the ions used to produce the electrochromic phenomenon in the electrochromic material when the electrochromic material is in the bleached state, the counter electrode preferably has high transmittance and a neutral color when it holds significant quantities of these ions.

In some embodiments, nickel-tungsten oxide (NiWO) is used in the counter electrode layer. In certain embodiments, the amount of nickel present in the nickel-tungsten oxide can be up to about 90% by weight of the nickel-tungsten oxide. In a specific embodiment, the mass ratio of nickel to tungsten in the nickel-tungsten oxide is between about 4:6 and 6:4 (e.g., about 1:1). In one embodiment, the NiWO is between about 15% (atomic) Ni and about 60% Ni; between about 10% W and about 40% W; and between about 30% O and about 75% O.

In some embodiments, the thickness of second electrode layer 21 is about 50 nm about 650 nm. In some embodiments, the thickness of second electrode layer 21 is about 100 nm to about 400 nm, preferably in the range of about 200 nm to 300 nm.

Referring again to FIG. 1, substrates 24 and 25 have flat surfaces. That is, they have a surface coincides with the tangential plane in each point. Although substrates with flat surfaces are typically employed for electrochromic architectural windows and many other electrochromic devices, it is contemplated that the multi-layer devices of the present disclosure may have a single or even a doubly curved surface. Stated differently, it is contemplated that each of the layers of stack 28 have a corresponding radius of curvature. See, for example, U.S. Pat. No. 7,808,692 which is incorporated herein by reference in its entirety with respect to the definition of single and doubly curved surfaces and methods for the preparation thereof.

In one embodiment, ion conductor layer 10 is produced from a liquid ion conducting polymer feedstock that comprises a monomer, oligomer, or mixture of monomers and/or oligomers, a plasticizer, and an ionizable charge carrier such as a lithium salt. Optionally, the ion conducting polymer feedstock may additionally comprise a cross-linking catalyst and/or a viscosity increasing agent. The ion conducting polymer feedstock imparts certain mechanical and electrochemical properties to ion conductor layer 10. The respective components of the ion conducting polymer feedstock (i.e. monomer(s), oligomer(s), plasticizer(s), cross-linking catalyst(s), or viscosity-increasing agent(s)) may be optimized to improve mechanical and/or electrochemical properties of the ion conducting layer. For example, certain monomers may be selected to optimize color, durability, and crosslink density while certain plasticizers may be selected to optimize ion mobility. The ion conducting polymer feedstock may also comprise other additives to promote device performance such as moisture reduction additives (e.g.

nanoparticles of molecular sieves or fumed silica), UV stabilizers, pH buffers, and the like.

Typical monomers, oligomers, or mixtures of monomers and/or oligomers used in the ion conducting polymer feedstock may comprise, for example, at least one functional group selected from the group of epoxy, hydroxyl, carbonyl, sulfonyl, ethylene, styrene, vinyl, isocyanate, and acrylate, or repeat units of siloxane, polysulfone, or an oligomer comprising one or more of the listed functional groups. The selected monomer or oligomer may be cyclic or, more preferably, aliphatic. The selected monomer(s) or oligomer(s) may comprise monofunctional or polyfunctional (e.g. difunctional or trifunctional) monomer repeat unit(s), i.e. a monomer repeat unit having one, two, three or more polymerizable functional groups, or combination thereof, where the degree of functionality and ratio of monofunctional to polyfunctional monomers may be tuned to optimize the mechanical, durability, and electrochemical properties of ion conductor layer 10. For example, the density of the crosslink within ion conducting layer 10 tends to increase with the amount and/or the degree of polyfunctional monomer present in the ion conducting polymer feedstock. By way of further example, an ion conducting polymer feedstock having a ratio of polyfunctional monomer (e.g. diepoxide) to monofunctional monomer (e.g. monoepoxide) of about 3:1 would be expected to yield an ion conducting layer having lower ion mobility and higher lap shear strength than an ion conductor layer produced from a feedstock having a polyfunctional monomer to monofunctional monomer ratio of 1:1. Other variations in ion conducting polymer feedstock such as polymer backbone rigidity may also affect the mechanical and electrochemical properties of ion conducting layer 10.

Alternatively, a pre-formed polymer having crosslinkable functionality, such as glycidyl methacrylate (GMA) or poly-GMA, may be used in place of the monomer(s), oligomer(s), or mixture of monomer(s) and/or oligomer(s) in the ion conducting formulation. In one particular embodiment the pre-formed polymer may be polyethylene glycol methyl ether methacrylate (PEGMEMA) in combination with poly-GMA. The ratio of poly-EGMEMA to poly-GMA units in the pre-formed polymer may be in the range of approximately 1:1 to 9:1.

In some embodiments, the monomer(s), oligomer(s), or mixture of monomer(s) and/or oligomer(s) is/are present in the ion conducting polymer feedstock in an amount ranging from about 0 wt. % to 90 wt. % of the of the total ion conducting polymer feedstock formulation. For example, in one embodiment, the monomer(s), oligomer(s), or mixture of monomer(s) and/or oligomer(s) is/are present in an amount ranging from 5 wt. % to 50 wt. % of the of the total mass of ion conducting polymer feedstock. By way of further example, in one embodiment the monomer(s), oligomer(s), or mixture of monomer(s) and/or oligomer(s) is/are present at about 30 wt. % of the total mass of ion conducting polymer feedstock.

In any of these exemplary embodiments, the monomer(s), oligomer(s), or mixture of monomer(s) and/or oligomer(s) may preferably contain polyfunctional monomer in an amount ranging between about 0 wt. % and about 25 wt. % of the total mass of ion conducting polymer feedstock, varied relative to monofunctional monomer to optimize mechanical and electrochemical device properties. For example, ion conducting polymer feedstock having difunctional and monofunctional monomer in a ratio of about 3:1 will produce an ion conducting layer having a higher cross-link density than a feedstock having a 1:1 difunctional to monofunctional monomer ratio. This higher cross-link density would be expected to reduce ion mobility and may affect switching kinetics between less transmissive and more transmissive states. Additionally, higher cross-link density may also affect the adhesive and cohesive properties (as measured by lap shear tests) of the ion conducting layer.

The plasticizer of the ion conducting polymer feedstock may be any known plasticizer for electrochromic or battery systems, such as sulfolane, 3-methyl sulfolane, propylene carbonate, ethylene carbonate, or polyethylene glycol dimethyl ether, optionally combined with a viscosity-increasing agent. In one embodiment, the plasticizer is sulfolane, as ion conducting layers comprising sulfolane possess enhanced durability and color characteristics for the applications described elsewhere in this application over those ion conducting layers comprising propylene carbonate or polyethylene glycol dimethyl ether.

In some embodiments, plasticizer is present in the ion conducting polymer feedstock in an amount ranging from 10 wt. % to 90 wt. % of the of the total ion conducting polymer feedstock formulation. For example, in one embodiment, plasticizer is present in the ion conducting polymer feedstock in an amount ranging from 40 wt. % to 60 wt. % of the total ion conducting polymer feedstock formulation.

In some embodiments, the monomer(s), oligomer(s), or mixture of monomer(s) and/or oligomer(s) may be polymerized and cross-linked in situ where the polymerization reaction is initiated by a cross-linking catalyst comprising an ionizable charge carrier, preferably by cationic initiation. The source of the ionic charge carrier may be selected from a lithium ion source, a sodium ion source, a potassium ion source, or a proton source. For example, in one embodiment, the source of the ionizable charge carrier is lithium bis-trifluoromethanesulfonimide (LiTFSi). Optionally, one or more Lewis or Brönsted acids, such as $BF_3$, triflic acid, mesic acid, trifluoroacetic acid, and nanozeolites, may be added to the liquid formulation where necessary or desired to catalyze the polymerization reaction.

Alternatively, free standing fully formulated ion conducting films may be used in place of the crosslinking ion conducting formulation or the liquid ion conducting formulation may be used in a "cast in place" process where a pre-formed cavity between the anode and cathode is produced (edge sealed) and the formulation is forced into this cavity through fill ports.

In some embodiments, the ion conducting polymer feedstock comprises a viscosity-increasing agent. The viscosity-increasing agent may be any polymer compatible with the polymerization system, whether or not the polymer contains a reactive functional group. Suitable polymers include, for example, cellulose and cellulose derivatives (e.g. cellulose acetate, cellulose triacetate, cellulose propionate acetate, ethyl cellulose, methylcellulose, etc.), polysulfones, and polymer esters. In certain preferred embodiments, the durability of the ion conducting layer may be improved where the viscosity-increasing agent lacks amine functionality and is substantially free of polyethylene glycol. In some embodiments, the coloring of the ion conducting layer may shift from more yellow to less yellow or colorless where the viscosity-increasing agent is aliphatic and/or lacking amine functionality. In some embodiments, the viscosity increasing agent may be anhydrous to prevent electrolysis under the conditions of cycling. In some embodiments, the viscosity increasing agent may be solid and inert. Alternatively or in addition to a polymer, the viscosity-increasing agent may comprise an aggregation of particles such as fumed silica.

In some embodiments, the ion conductor polymer feedstock may be stored for a period of time prior to use in forming an ion conducting layer. In one embodiment, the ion conducting polymer feedstock may be formulated in two or more distinct components and stored in separate containers. In such an embodiment, for example, the first component may comprise a monomer, oligomer, or mixture of monomers and/or oligomers, the second component may comprise a cross-linking catalyst (i.e. an ionizable charge carrier and/or acid), and either the first component or the second component or both may comprise other additives such as a plasticizer or viscosity-increasing agent. The separately-stored monomer and cross-linking catalyst components may be mixed at the point of deposition onto a substrate in proportions sufficient to result in the desired cross-linking density upon polymerization.

In an alternative embodiment, the ion conducting polymer feedstock may be formulated in a single container comprising monomer(s), oligomer(s), or mixture of monomer(s) and/or oligomer(s), a cross-linking catalyst, and other additives such as a plasticizer or viscosity-increasing agent. A single-container ion conducting feedstock may be used where the monomer and cross-linking catalyst components remain unreacted until an external energy source such as thermal or UV radiation is applied to the system to initiate polymerization and cross-linking.

The viscosity of the ion conducting formulation as dispensed may be engineered to achieve a desired viscosity. Regardless of the use of single-container or multi-container feedstock, the ion conducting formulation as dispensed may, for example, have a viscosity of between about 15,000 cP and about 100,000 cP at room temperature (i.e. 25° C.). By way of further example, in one embodiment the ion conducting formulation as dispensed may have a viscosity of between about 20,000 cP and 50,000 cP at room temperature. By way of further example, in one embodiment the ion conducting formulation as dispensed may have a viscosity of between about 25,000 cP and 35,000 cP at room temperature. By way of further example, in one embodiment the ion conducting formulation as dispensed may have a viscosity of about 30,000 cP at room temperature.

In embodiments utilizing a multi-container ion conducting polymer feedstock, each of the monomer component and the cross-linking catalyst component may be engineered to achieve a desired viscosity upon mixing of the two components for dispense (e.g. dispense from a nozzle onto a substrate). In such embodiments, viscosity of the monomer component is typically increased by the addition of a viscosity-increasing agent to be substantially higher than the desired dispense viscosity. Conversely, the viscosity of the cross-linking catalyst component is substantially lower than the desired dispense viscosity. In one exemplary embodiment, a monomer component comprising an epoxy monomer may have a viscosity of about 40,000 cP at room temperature (i.e. 25° C.) and a cross-linking catalyst component may have a viscosity of about 5,000 cP at room temperature, where viscosity of the mixed monomer component and catalyst component as dispensed is between about 25,000 cP and about 35,000 cP, or more preferably about 30,000 cP, at room temperature.

The ion conducting layer incorporated into the multi-layer structures of the present disclosure may be prepared by a number of deposition processes including wet-coating, spray coating, dip coating, roller coating, blade coating, screen printing, and nozzle application by a single jet, multiple jets, or an array of nozzles.

Referring again to FIG. 1, ion conductor layer 10 may be incorporated into electrochromic multi-layer stack 28 by a series of steps involving dispensing the ion conducing formulation then laminating and curing the stack. For example, ion conducting polymer feedstock is deposited or dispensed from a nozzle onto a first multi-layer stack comprising a first substrate and a first electrode layer. A second multi-layer stack comprising a second electrode layer and a second substrate is subsequently laminated onto the first multi-layer stack to form an electrochromic multi-layer stack comprising, in succession, the first substrate, the first electrode layer, the ion conducting formulation layer, the second electrode layer, and the second substrate, the first electrode layer, the second electrode layer, or both comprising an electrochromic material. Optionally, the first or second or both the first and second multi-layer stack(s) may comprise a polyisobutylene (PIB) seal around the edge forming a barrier between the environment and the ion conducting formulation layer. The lamination step comprises vacuum sealing of the first and second multi-layer stacks at 1 torr to remove air and press the ion conducting formulation layer to uniform thickness. The vacuum-sealed multi-layer stack may be heated to between about 80° C. and about 150° C. to further seal the multi-layer stack, initiate polymerization and cross-linking, and melt polyisobutylene. Curing may occur by continuing to apply heat or other electromagnetic radiation such as ultraviolet, infrared, or gamma radiation. For example, in one embodiment, curing may occur by application of ultraviolet radiation for about 5 seconds. In an alternative embodiment, curing may occur by application of heat for not less than 5 minutes. In certain exemplary embodiments, curing may occur upon application of heat or electromagnetic radiation for between 10 minutes and 2 hours, between 15 minutes and 1 hour, or between 15 and 20 minutes. By way of further example, curing may occur upon application of heat or electromagnetic radiation over a period of hours or days. By way of further example, curing may occur upon application of heat or electromagnetic radiation over a period of hours or days. By way of further example, curing may occur upon application of heat or electromagnetic radiation for at least 16 hours.

In accordance with one aspect of the present disclosure, anodically coloring electrochromic materials and/or cathodically coloring electrochromic materials are prepared using thin-film deposition techniques. The resulting anodic and cathodic electrochromic films have a range of desirable properties and characteristics. For example, in one embodiment the anodic electrochromic material may have a bleached state voltage value significantly greater than 2.0V. In another embodiment, the anodic electrochromic material is provided in an electrochemically matched state relative to a cathodic electrochromic material in its fully bleached state for use in an electrochromic device. In another embodiment, the anodic electrochromic material is relatively stable; for example, the lithium nickel oxide material does not darken from its fully bleached state or deactivate (e.g., remain transparent but no longer function as an electrochromic anode material or film) at elevated temperatures in the presence of ambient air.

In one embodiment, the electrochromic materials comprised by the anode electrode (i.e., the first or second electrode 20, 21; see FIG. 1) of a multi-layer structure of the present disclosure are inorganic or organometallic and the electrochromic materials comprised by the cathode (i.e., the other of the first or second electrode 20, 21; see FIG. 1) are independently inorganic or organometallic. More specifically, the electrochromic materials comprised by the anode and/or the cathode are inorganic or organometallic solid state materials with 3-D framework structures comprising metals bridged or separated by anionic atoms or molecules such as oxide, hydroxide, phosphate, cyanide, halide, that further comprise mobile ions such as protons, lithium, sodium, potassium that can intercalate and de-intercalate as the material is reduced or oxidized during the electrochromic cycle.

The anodic and cathodic films incorporated into the multi-layer structures of the present disclosure, except where specifically noted, may be prepared by a number of deposition processes including vapor deposition processes, wet-coating processes, spray coating processes, dip coating, and electrodeposition.

Having described the disclosure in detail, it will be apparent that modifications and variations are possible without departing the scope of the disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1: Preparation of Ion Conducting Polymer Feedstock

A first mixture is prepared by combining 60 g of sulfolane, 40 g of LiTFSi and 1 g of a $BF_3$ solution (10 mg $BF_3 \cdot OEt_2$ in sulfolane). A second mixture is prepared by combining 60 g of sulfolane, 15 g of cellulose acetate (40K MW), 22.5 g of butyl glycidyl ether and 2.5 g of diglycidyl cyclohexanedicarboxylate. The first mixture and second mixture are combined immediately prior to dispense from a nozzle to form an ion conducting polymer feedstock having a viscosity of approximately 25,000 cP at room temperature.

Example 2: Alternative Preparation of Ion Conducting Polymer Feedstock

A first mixture is prepared by combining 60 g of sulfolane, 40 g of LiTFSi and 1 g of a $BF_3$ solution (10 mg $BF_3 \cdot OEt_2$ in sulfolane). A second mixture is prepared by combining 60 g of sulfolane, 15 g of cellulose acetate (40K MW), 17.5 g of butyl glycidyl ether and 7.5 g of diglycidyl cyclohexanedicarboxylate. The first mixture and second mixture are combined immediately prior to dispense from a nozzle to form an ion conducting polymer feedstock having a viscosity of approximately 25,000 cP at room temperature.

Example 3: Process for Assembling Multi-Layer Stack

Figure 3:
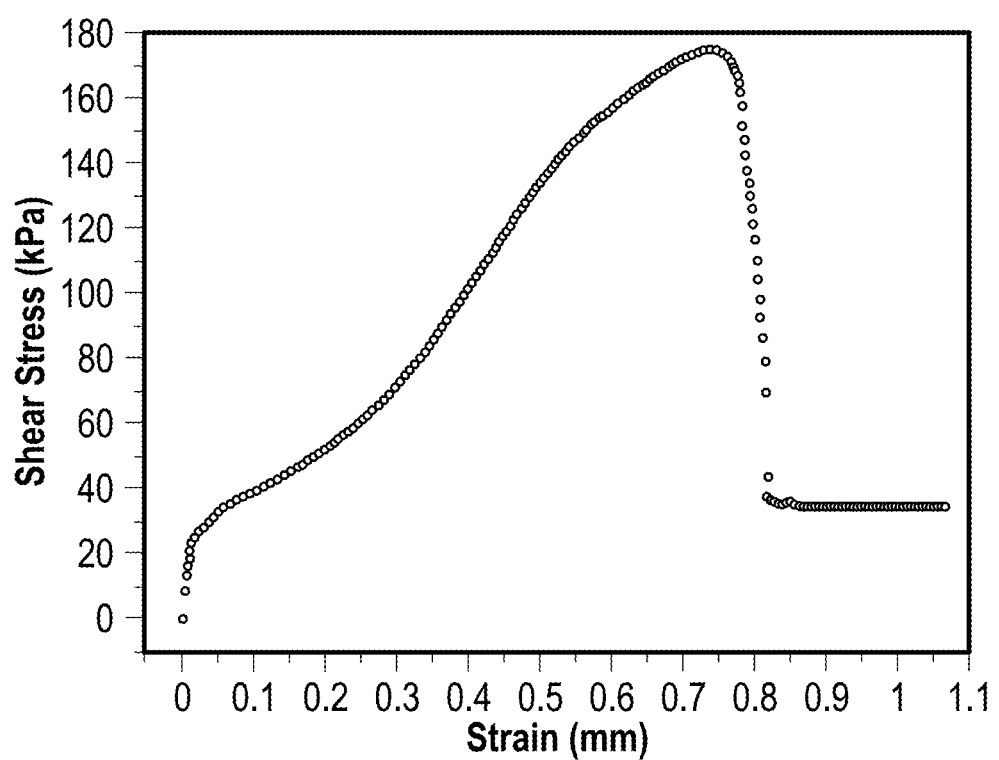
FIG. 3 is a stress-strain curve corresponding to a lap shear strength measurement, as more fully described in Example 3.
Figure 4:
FIG. 4 is an embodiment of a cross-section of a device during manufacturing.
Figure 4:
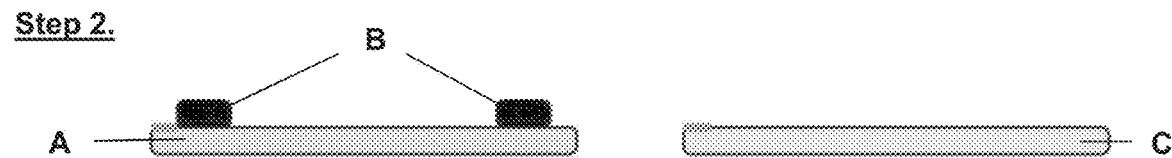
Figure 4:
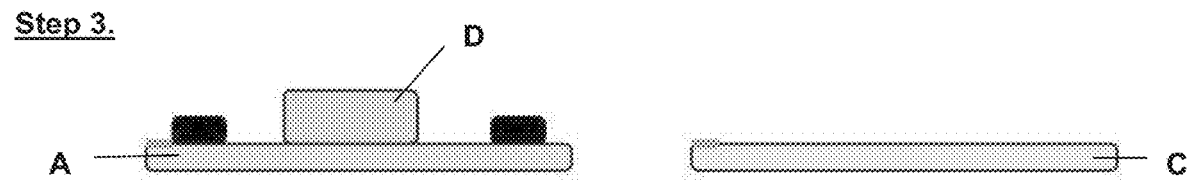
Figure 4:
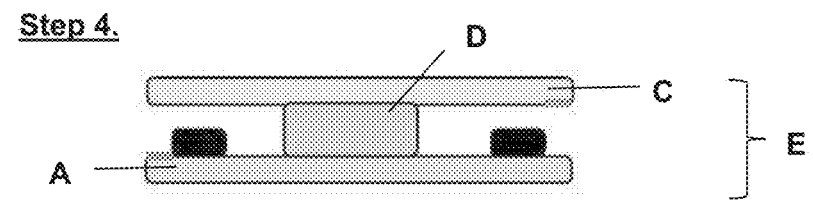
Figure 4:
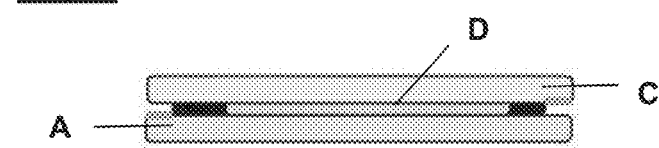
Figure 4:
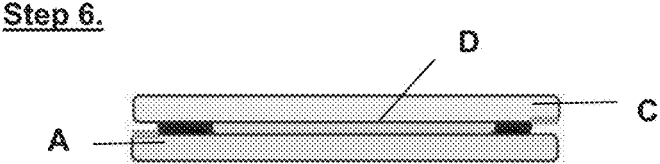

As illustrated by FIG. 3, an edge seal B comprising polyisobutylene is deposited on the perimeter of a first electrode A. The ion conducting polymer feedstock C of Example 2 is coated onto first electrode B using a slot die, a spray coater, a wire bar coater, or a roller coater without contacting the edge seal B. A second electrode D is then paired with first electrode A supporting the ion conducting polymer feedstock and laminated to form multi-layer stack E. After lamination and application of a pressure between 5 and 50 psi, the ion conducting polymer feedstock spreads evenly to cover the space between first electrode A and second electrode C. Edge seal B is compressed and becomes directly adjacent to the ion conductor layer. The laminate is cured at 150° C. for 16 hours. Lap shear strength of the ion conductor layer after cure is about 180 kPa, as measured at 1.27 mm at room temperature according to ASTM D3163.

What is claimed is:

1. An ion conducting polymer feedstock material comprising:
   a cross-linkable ion conducting polymer comprising about 5 wt. % to about 50 wt. % of the feedstock material;
   an ionizable charge carrier;
   a moisture reduction additive comprising particles having a particle size of less than 350 nm; and
   a plasticizer;
   wherein, the ion conducting polymer feedstock material has a viscosity of about 20,000 cP to about 50,000 cP.

2. The ion conducting polymer feedstock material of claim 1, wherein the ion conducting polymer comprises a mixture of monomers and oligomers.

3. The ion conducting polymer feedstock material of claim 2, wherein the monomers comprise at least one functional group selected from the group of epoxy, hydroxyl, carbonyl, sulfonyl, ethylene, styrene, vinyl, isocyanate, and acrylate.

4. The ion conducting polymer feedstock material of claim 2, wherein the monomers comprise epoxide monomers wherein the epoxide monomers are selected from the group consisting of: bis[1-ethyl(3-oxetanyl)]methyl ether, bisphenol-A diglycidyl ether, diglycidyl 1,2-cyclohexanedicarboxylate, 1,4-cyclohexanedimethanol diglycidyl ether, pentaerythritol tetraglycidyl ether, trimethylolpropane triglycidylether, and butanediol diglycidyl ether.

5. The ion conducting polymer feedstock material of claim 1, wherein the plasticizer is selected from the group of sulfolane, 3-methyl sulfolane, propylene carbonate, ethylene carbonate, polyethylene glycol dimethyl ether, and polyethylene glycol methyl ether methacrylate.

6. The ion conducting polymer feedstock material of claim 1, wherein the ion conducting polymer feedstock material further comprises a viscosity-increasing agent selected from the group of cellulose, cellulose acetate, cellulose triacetate, cellulose propionate acetate, or ethyl cellulose.

7. The ion conducting polymer feedstock material of claim 1, further comprising a cross-linking catalyst wherein the cross-linking catalyst comprises a Lewis acid or a Brönsted acid in an amount sufficient to initiate polymerization of the monomer.

* * * * *